United States Patent [19]

Takiguchi et al.

[11] Patent Number: 6,151,093
[45] Date of Patent: Nov. 21, 2000

[54] LIQUID CRYSTAL DISPLAY DEVICE HAVING MIXTURE TO SUPPRESS CHANGING SWITCHING CHARACTERISTICS WITH TEMPERATURE OF THE LIQUID CRYSTAL DISPLAY DEVICE

[75] Inventors: Yasuyuki Takiguchi, Sagamihara; Hiroyuki Takahashi, Yokohama, both of Japan

[73] Assignee: Ricoh Company, Ltd., Tokyo, Japan

[21] Appl. No.: 09/122,676

[22] Filed: Jul. 27, 1998

[30] Foreign Application Priority Data

Jul. 31, 1997 [JP] Japan .................................... 9-219963

[51] Int. Cl.[7] .......................... C09K 19/02; G02F 1/1335
[52] U.S. Cl. ............................. 349/172; 349/115; 349/175
[58] Field of Search ...................................... 349/172, 115, 349/175

[56] References Cited

U.S. PATENT DOCUMENTS 4,239,345  12/1980  Berreman et al. ...................... 350/331
4,840,463   6/1989  Clark et al. ............................. 350/350
5,624,600   4/1997  Takiguchi et al. ...................... 252/299
5,726,460   3/1998  Katagiri et al. ........................... 257/59
5,731,861   3/1998  Hatano et al. ........................... 349/169
6,072,558   6/2000  Tanaka et al. ........................... 349/179

*Primary Examiner*—Kenneth Parker
*Assistant Examiner*—Mike Qi
*Attorney, Agent, or Firm*—Oblon, Spivak, McClelland, Maier & Neustadt, P.C.

[57] ABSTRACT

A bistable liquid crystal display device includes a liquid crystal material which has a plurality of states, such as a stable state with a twist angle $w_0$ and first and second metastable states with $w_0$ 180° and $w_o$-180°, respectively, wherein $w_0$ is a twist angle along a direction of cell thickness of the liquid crystal material at an initial stable state. In order to properly drive the liquid crystal device, a first pulse voltage is applied to induce a transition from the stable state to a homeotropic state for the liquid crystal material, and a second voltage pulse is subsequently applied to relax the liquid crystal material from the homeotropic state selectively to either the first or second metastable state depending on the pulse shape. The liquid crystal material is composed such that a change of unstrained pitch thereof with temperature may suppress the change of switching behaviors with temperature, to thereby improve display characteristics of the liquid crystal device.

16 Claims, 3 Drawing Sheets

LIQUID CRYSTAL DISPLAY DEVICE HAVING MIXTURE TO SUPPRESS CHANGING SWITCHING CHARACTERISTICS WITH TEMPERATURE OF THE LIQUID CRYSTAL DISPLAY DEVICE

BACKGROUND OF THE INVENTION

1. Field of the Invention

This invention relates in general to liquid crystal display devices, and more particularly, to display devices including cholesteric liquid crystals having a bistable capability and improved switching characteristics.

2. Discussion of the Background Art

In a background liquid crystal display device, a thin layer of liquid crystal material is interposed between light transparent substrates which are provided with delineated electrodes and alignment films on their inner confronting surfaces. Polarizing plates are also positioned adjacent to external surfaces. By selectively applying an electric field across the layer of liquid crystal material by address potentials applied to the electrodes, the transmittance of the liquid crystal device may be changed for displaying information in accordance with the addressed electrodes.

Several liquid crystal display devices using bistable cholesteric liquid crystals have been disclosed. For example, Japanese Patent H1-51818 discloses a liquid crystal display device with a plurality of liquid crystal cells which include a layer of cholesteric liquid crystals constituted to have an unstrained pitch approximately twice as large as a thickness of the liquid crystal layer.

Liquid crystal cells have a bistable character and can be switched between two states by the application of potential voltages to transparent electrodes, such that a twist angle of the liquid crystal layer along the layer thickness is approximately either 360° or 0°, corresponding to a twisted state or a non-twisted (or uniform) state, each of which is hereinafter referred to as a twisted state or a uniform state, respectively. In addition, the liquid crystal cells are further provided with a pair of polarizing plates placed on respective top and bottom faces of the cell, thereby constituting a liquid display device.

When the polarizing plates are provided such that a transparency axis of one polarizing plate makes a right angle relative to a transparency axis of the other polarizing plate, and such that a direction of the liquid crystal alignment at the uniform state makes a 45° angle relative to the transparent axis of each polarizing plate, birefringent colors appear due to the wavelength dependent nature of transmitted light through the polarizing plates.

These birefringent colors are generally not preferable for a display quality of black-and-white displays. Therefore, for liquid crystals at the uniform state with such a construction, which have an optical anisotropy Δn and a thickness of the liquid crystal layer d, an Δnd value may be adjusted to about 270 nm to satisfy retardation requirements for visible light, and to thereby acquire an approximately white display color.

In addition, although some birefringent effect may also arise in the twisted state, this does not significantly affect the nearly black display color quality due to relatively small values of the birefringence effect in the twisted state.

Display colors of nearly black and white quality can thus be achieved by background bistable liquid crystal display devices using cholesteric liquid crystals.

In order to implement driving of such liquid crystal devices with bistable cholesteric liquid crystals, at least two pulse voltages may preferably be applied to produce an electric field across a liquid crystal cell.

A first pulse is applied so as to have an amplitude large enough to bring the liquid crystals into a homeotropic state. A second pulse is subsequently applied with an amplitude less than that of the first pulse or with a zero amplitude, to cause a transition to either a twisted state or a uniform state depending on the amplitude and width of the pulse and to thereby accomplish modulation in optical transmittance or reflectivity, which can be utilized in display devices.

Because of an intrinsic property of the liquid crystal display, in that the modulation of optical transmittance of the device is implemented through the transition between the states described above, the display quality of the device, in general, tends to be affected considerably by temperature. For instance, although the device can be operated satisfactorily at room temperature under certain driving conditions, the device often suffers, at lower temperatures, from a decrease in display contrast or sometimes from operation failures even under the same driving conditions.

Although it is known that display quality of a liquid display device is relatively easily affected by temperature, this is particularly noticeable for a case of liquid crystal devices with bistable cholesteric liquid crystals. FIG. 4 illustrates a relationship experimentally obtained between temperature and thickness of a liquid crystal layer (or cell spacing), including the preferable range of these values for successful device operation.

As shown in FIG. 4, a desirable cell spacing which has been adjusted once to comply with driving conditions at room temperature may not be satisfactory at lower temperatures, since the desirable spacing is deviated from the aforementioned range preferable for device operation.

SUMMARY OF THE INVENTION

It is therefore an object of the present invention to provide a novel liquid crystal display which overcomes the above-noted difficulties.

A further object of the present invention is to provide a novel liquid crystal display device which has a high display contrast versus temperature characteristics improved over background art bistable liquid crystal devices using cholesteric liquid crystals.

In one embodiment of the present invention, a novel bistable liquid crystal display device is provided to include liquid crystal material which has a plurality of states, such as a stable state with a twist angle $w_0$ and first and second metastable states with $w_0+180°$ and $w_0-180°$, respectively, wherein $w_0$ is a twist angle along a direction of cell thickness of the liquid crystal material at an initial stable state.

In order to properly drive the liquid crystal device, a first pulse voltage is applied to induce transition to a homeotropic state for the liquid crystal material and a second voltage pulse is subsequently applied to relax the liquid crystal material from the homeotropic state selectively to either the first or second metastable state, depending on the pulse shape (e.g., amplitude and width of the pulse).

The liquid crystal material is composed in the present invention such that a change of unstrained pitch thereof with temperature may suppress the change of switching behaviors with temperature to thereby improve display characteristics of the liquid crystal device.

As noted above, as shown in FIG. 4, a desirable cell spacing which has been adjusted once to comply with driving conditions at room temperature may not be satisfactory at lower temperatures, since the desirable spacing is deviated from the aforementioned range preferable for device operation. This difficulty may be overcome by compensating for the increase of the cell spacing d at low temperatures (FIG. 4) with a decreased pitch, which can be realized by using liquid crystal materials or a mixture thereof, which have such a temperature coefficient of unstrained free pitch that increases with temperature (or, that decreases with lowering the temperature), and a proper driving with the above-mentioned once adjusted cell spacing can thereby be achieved even at low temperatures.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings wherein.

DESCRIPTION OF THE PREFERRED EMBODIMENTS

In the description which follows, specific embodiments of the present invention are particularly useful in liquid crystal display devices, including a cholesteric liquid crystal material having a bistable character. However, it is understood that the present invention is not limited to these embodiments. For example, it is appreciated that the construction and the fabrication methods of the liquid crystal display in the present invention are adaptable to any form of liquid crystal display device. Other embodiments will be apparent to those skilled in the art upon reading the following description.

Figure 1:
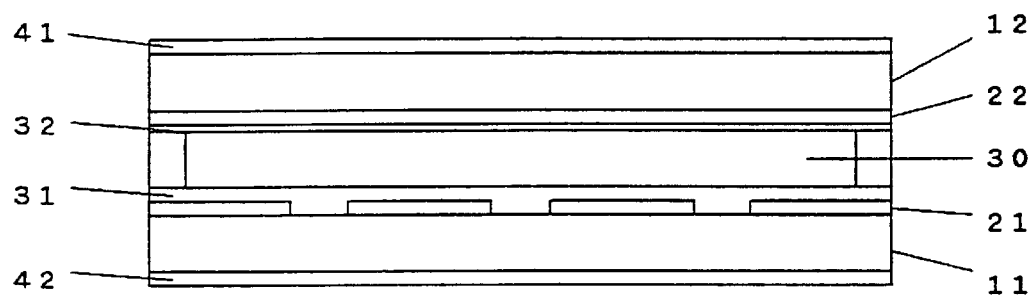
FIG. 1 is a cross-sectional view of a bistable liquid crystal display device in accordance with the present invention.

FIG. 1 is a cross-sectional view of a bistable liquid crystal display device according to the present invention which includes a liquid crystal layer 30 which is interposed between a pair of substrates 11, 12. The liquid crystal layer 30 preferably used in the present invention includes nematic liquid crystal materials mixed with cholesteric liquid crystals such that the resultant liquid crystal layer 30 exhibits a cholesteric phase.

A first or bottom substrate 11 has at least one delineated electrode 21. A second or top substrate 12 also has at least one delineated electrode 22 and is arranged substantially parallel to the first electrode 11. The liquid crystal layer 30 is interposed and is then sealed between the first substrate 11 and the second substrate 12. In addition, alignment layers 31 and 32 are each provided over electrodes 21 and 22, respectively. Polarizing plates 41 and 42 are respectively provided on the first and second substrates 12 and 11 opposite from surfaces thereof which contact the liquid crystal layer 30.

Figure 2:
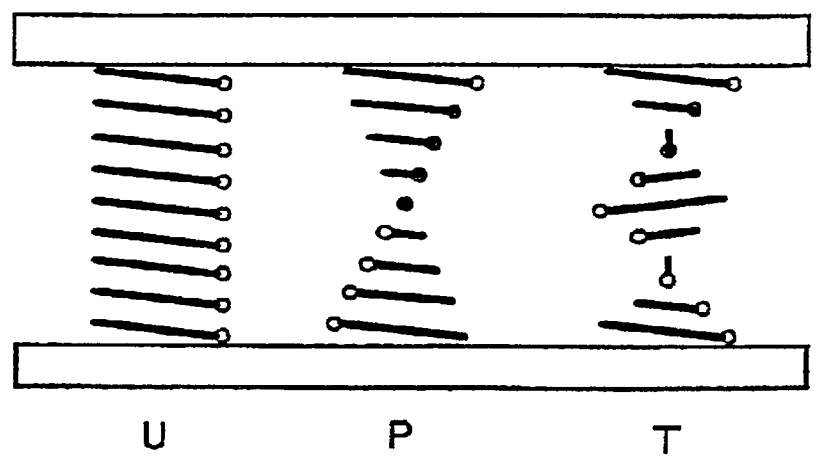
FIG. 2 is a cross-sectional view of a schematic diagram of liquid crystal molecules in the display device of FIG. 1, showing orientations of the liquid crystal molecules in a liquid crystal cell.

FIG. 2 is a cross-sectional view of a schematic diagram of liquid crystal molecules in the display device of FIG. 1, illustrating orientations of the liquid crystal molecules in a liquid crystal cell. The liquid crystal molecules in the liquid crystal cell are aligned by the alignment layers 31, 32 so as to have a slight angle of inclination relative to the surface of each substrate 11, 12, wherein the angles of inclination are opposite in sign, to each of the top and bottom substrates 11, 12. Various states are illustrated in FIG. 2, such as U, P, and T states, each corresponding to untwisted, twisted by 180°, and twisted by 360°, respectively.

As aforementioned, the liquid crystal layer 30 is composed so as to have an unstrained (or natural) pitch $P_o$ of approximately twice as large as the thickness of the liquid crystal layer or the cell spacing. Therefore, without any strain by alignment layers, the 180° twisted state (P state) is a stable state for the liquid crystal layer 30.

However, when the liquid crystal cell is constructed for the liquid crystal molecules to have inclination angles opposite in sign relative to each of the top and bottom substrates 11, 12, as illustrated in FIG. 2, an increase in an elastic energy arises due to spray deformation in the 180° twisted state, to thereby result in two metastable states U and T.

Driving of the liquid crystal device of this construction may be carried out by the application of write pulses $V_W$ by, e.g., changing the amplitudes and/or widths, as follows.

Figure 3A:
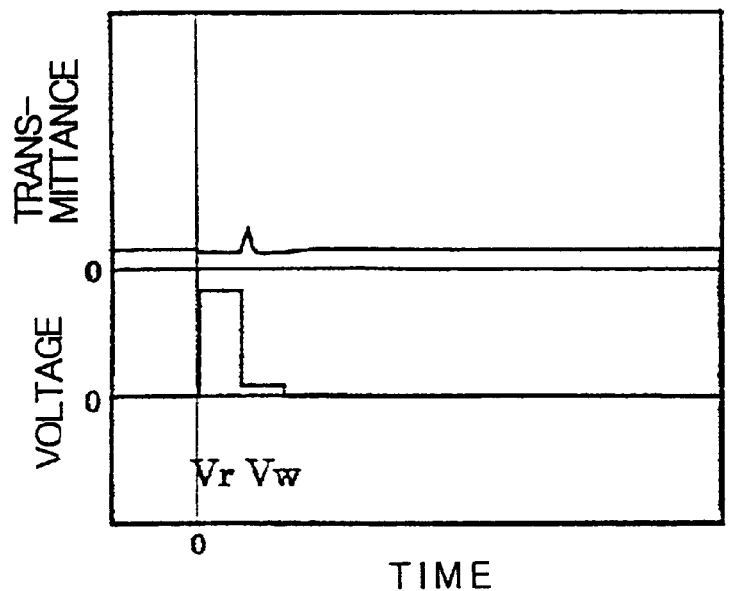
FIG. 3a is a graph illustrating change in cell transmittance and voltage pulses as a function of time, leading to a T metastable state through an application of a first write pulse $V_W$.
Figure 3B:
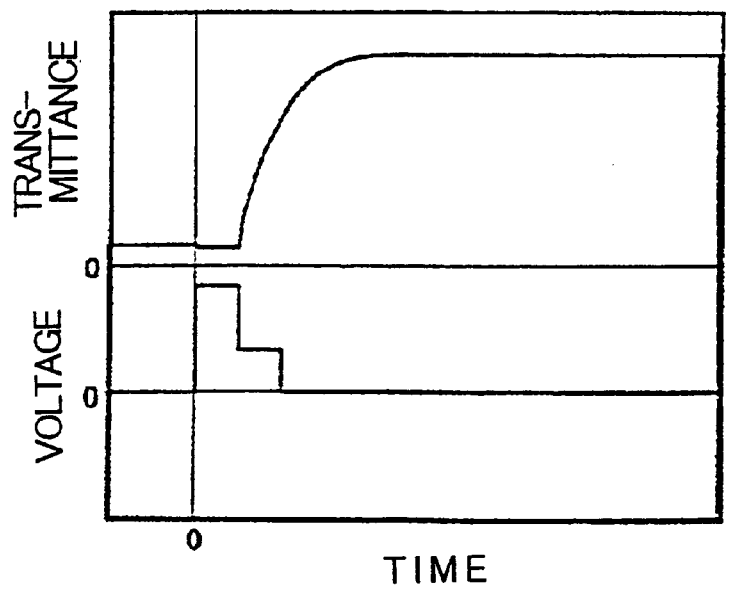
FIG. 3b is a graph illustrating change in cell transmittance and voltage pulses as a function of time, leading to a U metastable state through an application of another write pulse $V_W$.
Figure 4:
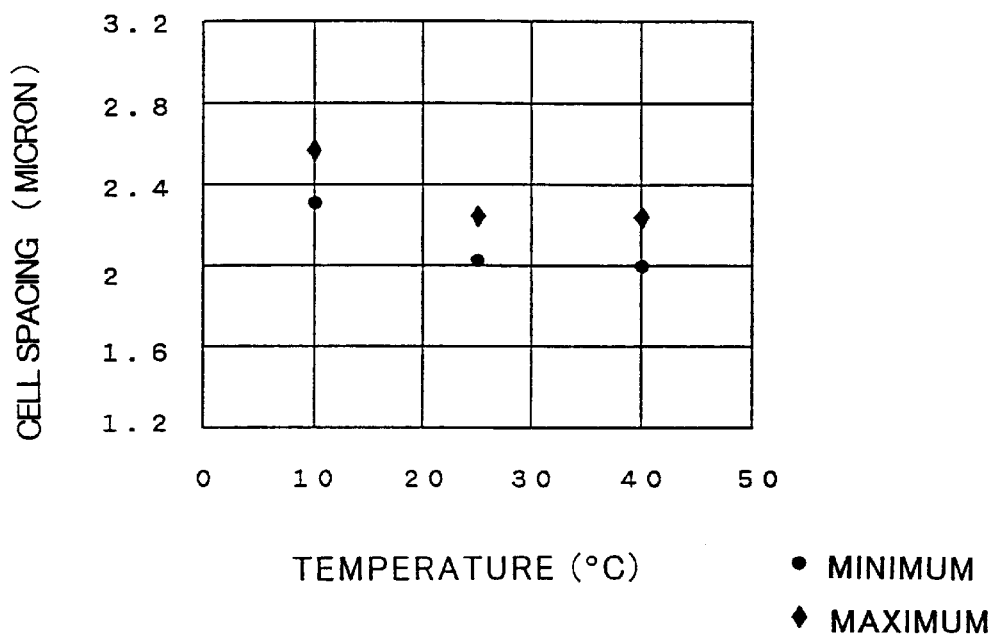
FIG. 4 is a graph showing a relationship between thickness of a liquid crystal cell with temperature, including a range of values preferable for device driving under certain conditions.

A first pulse is applied with a large amplitude to reset the orientation of liquid crystal. Upon the application of a second pulse having a relative large amplitude succeeding the first pulse (see FIG. 3b), a reversed rearrangement (or backward flow) in the liquid crystal molecular orientation takes place due to a rapid relaxation, and the liquid crystal molecules become twisted further by 180° from an initial arrangement, thereby leading to the 360° twisted or T metastable state (FIG. 2).

By contrast, when another second pulse is applied with a relatively small amplitude (see FIG. 3a), the above-mentioned backward flow is suppressed to thereby lead to the untwisted U metastable state (FIG. 2).

As another feature of the present invention, a bistable liquid crystal display device can be provided such that the unstrained pitch of the liquid crystal layer 30 increases with increasing temperature so as to reduce the change in switching characteristics with temperature for the display device.

It is noted that the term "unstrained pitch" (or natural pitch) means the pitch of the liquid crystal molecules in a liquid crystal cell under the condition of no field externally exerted, such as a restrictive aligning force due to surface effect. The unstrained pitch may be measured with relative ease by, for example, the Cano wedge method.

Figure 5:
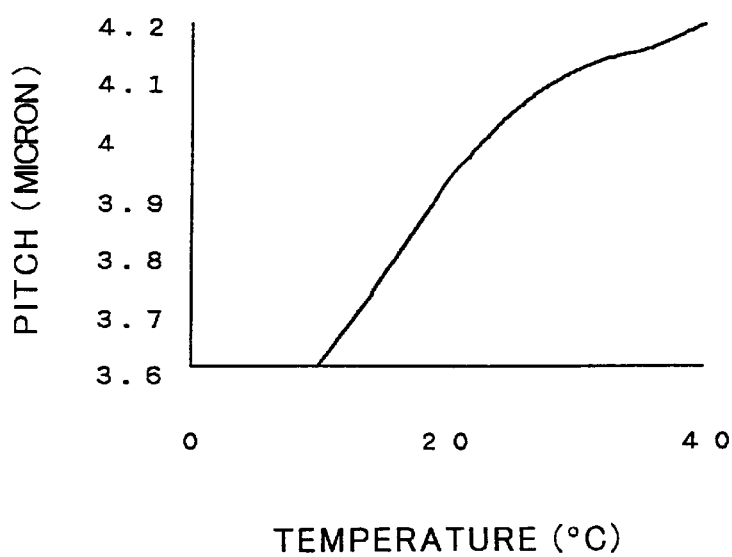
FIG. 5 is a graph showing a relationship between unstrained pitch of liquid crystal molecules and temperature, indicating a range of values preferable for device driving under conditions of a fixed cell spacing.

FIG. 5 is a graph showing a preferred relationship for device driving between the unstrained pitch of the liquid crystal molecules and temperature under the condition of a fixed cell spacing.

As mentioned above, a liquid crystal display of the present invention can be fabricated such that an unstrained pitch of the liquid crystal material increases with increasing temperature. With this construction, switching characteristics with temperature can be considerably improved for the display device. The rate of change of temperature coefficient of the pitch of the liquid crystal material is preferably from 0.2 to 1%/° C., and more preferably from 0.4 to 0.8%/° C.

The liquid crystal layer 30 of the present invention may thus be preferably formed of a mixture of a liquid crystal material and optically active materials which have such a temperature coefficient that increases with temperature upon mixing. Among optically active materials, optically active liquid crystal materials may preferably be used from the view point of compatibility with the above-mentioned liquid crystal material and the temperature range of the liquid crystalline phase of resulting mixtures, which will be described hereinbelow.

When optically active materials do not exhibit a liquid crystalline phase, this may give rise to difficulties such as not being soluble in the liquid crystal materials and/or not being resolved up to a concentration necessary to induce a desired value of the pitch.

For example, when optically active materials are liquid without a liquid crystalline phase, this may result in a considerable lowering of a temperature of a transition between nematic and isomorphic phases. In addition, when optically active materials are solid, this may result in a marked increase of a temperature of a transition between crystalline and nematic phases.

Examples of liquid crystal materials having the above-mentioned preferable temperature characteristics of the unstrained pitch include, but are not limited to, a nematic liquid crystal mixed with optically active materials which have such a temperature coefficient of the pitch by themselves that increases with temperature upon mixing, or combinations thereof. As a specific example of such materials, there can be cited CB 15 (from E. Merck) which has a temperature coefficient of approximately 0.3%/° C.

Examples of the above-mentioned optically active liquid crystal materials include a mixture which is composed of two component materials such that (1) when added individually to a liquid crystal material, each component material has a twist direction opposite to each other and has a different temperature coefficient of the unstrained pitch, and (2) from values of the pitch obtained when added individually to a nematic liquid crystal material, a mixture thereof is composed in such a composition that the difference between pitches of these two component materials increases with temperature.

In this construction, it is noted that the twist direction of the resultant mixture coincides with the direction of the one of the component materials with a smaller pitch.

In order to accomplish the above-mentioned temperature characteristics in the pitch, it is preferable for the composition to be adjusted such that (1) a first pitch resulting from the addition of optically active material with a smaller value of the above-mentioned temperature coefficient of the pitch is larger than (2) a second pitch resulting from the addition of optically active material having a larger value of the pitch. It is particularly preferable for the mixture to be composed of (1) a liquid crystalline material with an optically active component with a positive temperature coefficient of the pitch (i.e., increasing the pitch with temperature), and (2) another liquid crystal material with another optically active component with a negative temperature coefficient.

Furthermore, it is also preferable for the liquid crystal mixture to be composed of two optically active component materials such that when each optically active component material is added individually into a liquid crystal material, each optically active component material has a temperature coefficient in the pitch opposite in its sign and has its direction of the twist again opposite to each other, thereby resulting in a large change in temperature characteristics.

The ratio (d/P) of cell gap d and pitch P induced by the liquid crystal material mixed with an optically active material is a parameter of practical importance. For a liquid crystal material with $w_0=360°$ of the present invention, the ratio d/P at room temperature (i.e., approximately 20° C.) is preferably from 0.4 to 0.9. For d/P values other than in the above range, decreases are encountered in switching characteristics of the device.

An amount of an optically active material necessary to induce the above-mentioned pitch is dependent on a type of the optically active material, liquid crystal material, and/or cell spacing of current use, and is especially dependent on the optically active material. For a cell gap of from 2 to 3 microns, a pitch value is preferably from 2 to 8 microns, which results from the addition of optically active materials in an amount typically from 0.5 to 30% by weight.

The following examples are provided to further illustrate preferred embodiments of the present invention.

EXAMPLES

Example 1

A sheet of plate glass having transparent electrodes was coated with polyimide (AL3046 from Japan Synthetic Rubber Co) and subsequently alignment treated by rubbing, thereby forming a first substrate.

A second substrate was prepared in a similar manner as above. The first and second substrates were subsequently positioned apart from, and opposed to, each other with an alignment direction by rubbing treatment being at 180° with respect to each other (i.e., anti-parallel) and with silica beads disposed therebetween as spacers. A liquid crystal material was filled and then sealed between the substrates, thereby constituting a liquid crystal display cell.

In this embodiment, a liquid crystal material was prepared by adding an optically active material C15 (from E. Merck) to a nematic liquid crystal material ZLI1557 (from E. Merck) so as to properly adjust its pitch. A temperature coefficient of the pitch for the resultant liquid crystal material was obtained as approximately 0.3%/° C. By adjusting a cell spacing to about 2.4 microns using silica beads of an appropriate diameter, a d/P ratio of 0.65 was obtained.

The liquid crystal cell was further provided with a pair of polarizers which were placed on the surfaces of the substrates opposite from surfaces thereof which contact the liquid crystal material. Transparent axes of the two polarizers were positioned on the substrates to be mutually perpendicular to each other and so that they were at a 45° angle with respect to the direction of the alignment treatment, whereby a liquid crystal device of the present invention was fabricated.

Switching characteristics of the device were subsequently examined by applying a variety of voltage potentials to the device, which will be described hereinbelow.

When a first (or reset) pulse having a width of 1 millisecond and an amplitude of 30 volts was applied, a second pulse was adjusted to have a width of 0.5 millisecond and an amplitude of 1 or 4 volts.

Under these conditions, the liquid crystal device showed an excellent switching behavior at 25° C. with a display contrast of 50:1. In addition, a display contrast of 20:1 was obtained at 10° C.

Example 2

A liquid crystal display device was fabricated in a similar manner as in Example 1, with the exception that the liquid crystal material was prepared by adding two optically active materials to the nematic liquid crystal, one being CB 15 (from E. Merck) which induced a left-handed helical structure and the other being S811 which induced a right-handed structure in the nematic liquid crystal material, with a ratio of 75:25 by weight. A temperature coefficient of the pitch for the resultant liquid crystal material was obtained as approximately 0.58%/° C.

When switching characteristics of the device were subsequently examined in a similar manner as in Example 1, it was found that the device had an excellent switching behavior at 25° C. with a display contrast of 50:1. In addition, a display contrast of 40:1 was obtained even at 10° C.

Example 3

A liquid crystal display device was fabricated in a similar manner as in Example 1, with the exception that the liquid crystal material was prepared by adding two optically active materials to a nematic liquid crystal, one being CM22 (from Chisso Co.) and the other being S811 (from E. Merck), with a ratio of 70:30 by weight. When these optically active materials are added individually to the nematic crystal, the optically active material CM22 induces a decrease in the pitch and a left-handed helical structure, while the optically active material S811 gives rise to an increase in the pitch and a right-handed structure to the nematic liquid crystal material.

A temperature coefficient of the pitch for the resultant liquid crystal material was obtained as approximately 0.9%/° C. When switching characteristics of the device were subsequently examined in a similar manner as in Example 1, the device was found to have an excellent switching behavior at 25° C. with a display contrast of 50:1. In addition, a display contrast of 40:1 was obtained even at 10° C.

As described above, a liquid crystal device of the present invention is fabricated such that an unstrained pitch of the liquid crystal material increases with increasing temperature. With this construction of the liquid crystal display device, switching characteristics with temperature can be considerably improved for the display device over background art devices which may suffer from failures in switching behavior at low temperatures, caused by the use of liquid crystal materials in which unstrained free pitches decrease with increasing temperature, in contrast to the device of the present invention. The present invention thereby makes it feasible for a display device to be used at a wider range of temperatures without requiring additional auxiliary circuitry for compensating temperature effects, for example, to thereby lead to cost reduction for a display device.

In addition, liquid crystal materials in the present invention may be composed so as to conveniently adjust temperature coefficients of the pitches in compliance with desirable device characteristics. It is also worth mentioning that this adjustment can be feasible with a considerable wide range of temperatures satisfactory even for bistable liquid crystal display devices.

This application is based on Japanese Patent Application 9-219963, filed in the Japanese Patent Office on Jul. 31, 1997, the entire contents of which are hereby incorporated by reference.

Additional modifications and variations of the present invention are possible in light of the above teachings. It is therefore to be understood that within the scope of the appended claims, the present invention may be practiced otherwise than as specifically described herein.

What is claimed is:

1. A liquid crystal display device comprising:
   a pair of spaced apart substrates;
   a liquid crystal layer disposed between said pair of substrates, having an unstrained pitch of approximately twice as large as a spacing between said substrates, and said liquid crystal layer having a bistable character with a plurality of states including a stable state with a twist angle $w_0$ and first and second metastable states, where $w_0$ is a twist angle along a direction of thickness of the liquid crystal layer at an initial stable state; and
   wherein a first pulse voltage is applied to each of said substrates to induce transition from the initial stable state to a homeotropic state for said liquid crystal layer, and subsequently a second pulse voltage is applied to relax said liquid crystal layer from the homeotropic state selectively to either said first or second metastable state based on a shape of the second pulse voltage,
   wherein the liquid crystal layer is composed such that the unstrained pitch of the liquid crystal layer increases with temperature to suppress a change of switching characteristics with temperature of said liquid crystal display device.

2. A liquid crystal device in accordance with claim 1, wherein each of said pair of substrates has a direction of alignment at an angle of inclination to said substrate, and said pair of substrates are substantially parallel to each other.

3. A liquid crystal device in accordance with claim 1, wherein the shape of the second pulse voltage is variable in at least one of amplitude and width.

4. A liquid crystal device in accordance with claim 1, wherein the first and second metastable states are $w_0+180°$ and $w_0-180°$, respectively.

5. The liquid crystal display device in accordance with claim 1, wherein said liquid crystal layer includes a mixture of a liquid crystal material and optically active materials which have a temperature coefficient that increases with temperature upon mixing.

6. A liquid crystal display device in accordance with claim 5, wherein said liquid crystal layer includes a mixture which is composed of two component optically active materials such that (1) when added individually to said liquid crystal material, each of said two component optically active materials has a twist direction opposite to each other and has a different temperature coefficient of unstrained pitch, and (2) from values of the unstrained pitch obtained when added individually to a nematic liquid crystal material, said mixture is composed such that a difference in pitches between said two component optically active materials increases with temperature.

7. A liquid crystal display device in accordance with claim 6, wherein said liquid crystal layer includes a mixture of first and second component liquid crystal materials, said first component liquid crystal material having a first optically active component having a positive temperature coefficient of pitch, and said second component liquid crystal material having a second optically active component having a negative temperature coefficient.

8. A liquid crystal display device comprising:
   a pair of spaced apart substrates;
   a liquid crystal layer disposed between said pair of substrates, having an unstrained free pitch of approximately twice as large as a spacing between said substrates;

said liquid crystal layer having a bistable character with a plurality of states including a stable state with a twist angle $w_0$ and first and second metastable states, where $w_0$ is a twist angle along a direction of thickness of the liquid crystal layer at an initial stable state; and wherein a first pulse voltage is applied to each of said substrates to induce transition from the initial stable state to a homeotropic state for said liquid crystal layer, and subsequently applying a second voltage pulse to relax said liquid crystal layer from the homeotropic state selectively to either said first or second metastable state based on a shape of the second pulse voltage;

wherein said liquid crystal layer is composed such that the unstrained free pitch of the liquid crystal layer increases with increasing temperature to suppress a change of switching characteristics with temperature of said liquid crystal display device.

9. A liquid crystal device in accordance with claim 8, wherein each of said pair of substrates has a direction of alignment at an angle of inclination to said substrate, and said pair of substrates are substantially parallel to each other.

10. A liquid crystal device in accordance with claim 8, wherein the shape of the second pulse voltage is variable in at least one of amplitude and width.

11. A liquid crystal device in accordance with claim 8, wherein the first and second metastable states are $w_0+180°$ and $w_0-180°$, respectively.

12. The liquid crystal display device in accordance with claim 8, wherein the unstrained free pitch of said liquid crystal layer increases with increasing temperature at a rate of change of temperature coefficient of said unstrained free pitch from 0.2 to 1%/° C.

13. The liquid crystal display device in accordance with claim 12, wherein the rate of change of temperature coefficient is from 0.4 to 0.8%/° C.

14. The liquid crystal display device in accordance with claim 12, wherein said liquid crystal layer includes a mixture of a liquid crystal material and optically active materials which have a temperature coefficient that increases with temperature upon mixing.

15. The liquid crystal display device in accordance with claim 14, wherein said liquid crystal layer includes a mixture which is composed of two component optically active materials such that (1) when added individually to said liquid crystal material, each of said two component optically active materials has a twist direction opposite to each other and has a different temperature coefficient of the unstrained free pitch, and (2) from values of the unstrained free pitch obtained when added individually to a nematic liquid crystal material, said mixture is composed such that a difference in pitches between said two component optically active materials increases with temperature.

16. The liquid crystal display device in accordance with claim 15, wherein said liquid crystal layer includes a mixture of first and second component liquid crystalline materials, said first component liquid crystalline material having a first optically active component having a positive temperature coefficient of a spiral pitch, and said second component liquid crystalline material having with a second optically active component having a negative temperature coefficient.

* * * * *